Oct. 20, 1936.  H. A. ELLIOTT  2,057,772
MACHINE FOR MAKING PRETZELS
Filed Feb. 5, 1934  3 Sheets-Sheet 2
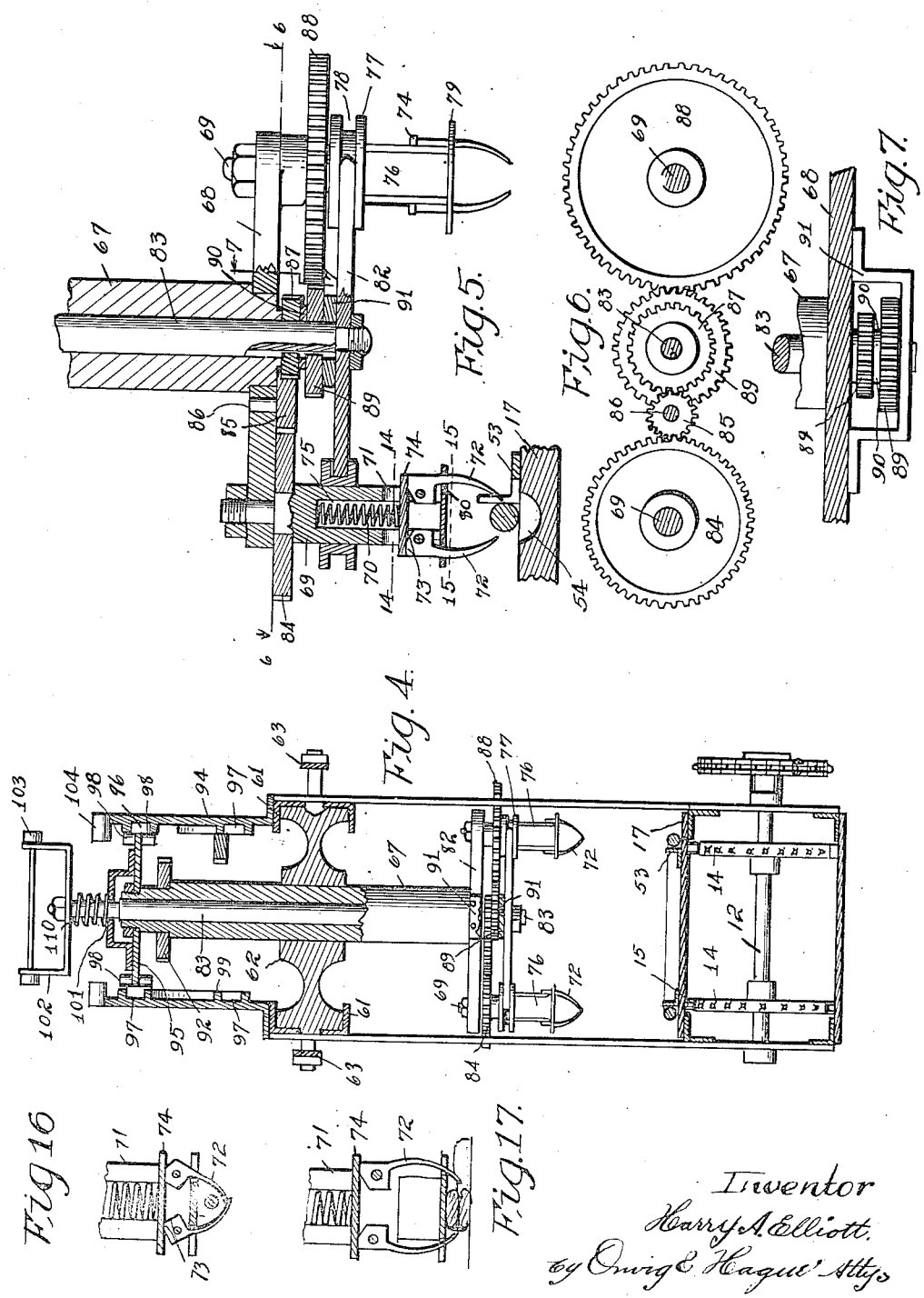

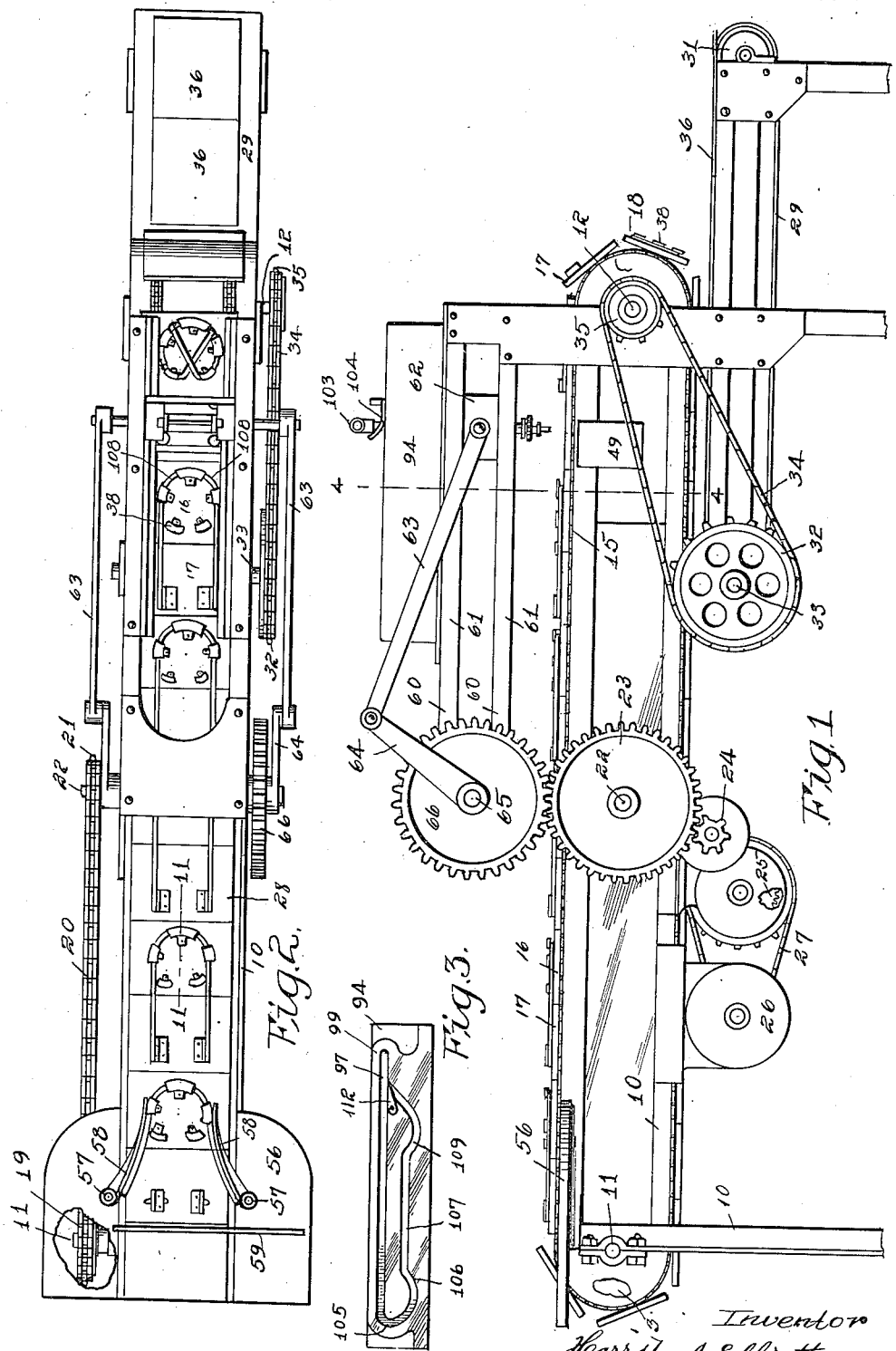

Oct. 20, 1936.  H. A. ELLIOTT  2,057,772
MACHINE FOR MAKING PRETZELS
Filed Feb. 5, 1934  3 Sheets-Sheet 3

Inventor
Harry A. Elliott.
by Ervig & Hague Attys

Patented Oct. 20, 1936

2,057,772

UNITED STATES PATENT OFFICE 2,057,772

MACHINE FOR MAKING PRETZELS

Harry A. Elliott, Jefferson, Iowa

Application February 5, 1934, Serial No. 709,752

13 Claims. (Cl. 107—8)

This invention relates to machines for forming pretzels from rods of semi-plastic dough, and delivering them to suitable plates or pans for baking.

I am aware that a number of machines have been patented for making pretzels, but insofar as I am aware none of these machines have been successfully put into commercial use, other than certain types which stamp the pretzels from sheets of dough, or so form the pretzels that they have a distinct mechanical appearance, or in other words, are poor imitations of hand made pretzels.

It is, therefore, the object of my invention to provide a simple, durable and inexpensive machine which is capable of receiving rods of semi-plastic pretzel dough and automatically forming them and delivering the formed pretzels to suitable baking pans or plates, and when baked will have a close resemblance to hand made pretzels.

A further object of my invention is to provide in a pretzel making machine improved forming device, and in connection therewith means for retaining the rod of dough in position on the form until after the forming operation has been completed, and wherein the pretzel may be easily and quickly delivered from the form.

A further object is to provide in a pretzel making machine adapted to form rods of dough into substantially U-shaped portions, improved means for picking up the ends of the dough and twisting the leg portions of the body member around each other, and finally placing them in position intersecting the curved portion of the body and pressing them in position so they will adhere in substantially the same manner as in the hand operation.

My invention consists in the construction, arrangement and combination of the various parts of the device whereby the objects contemplated are attained, as hereinafter more fully set forth, pointed out in my claims, and illustrated in the accompanying drawings, in which:

Figure 1 is a side elevation of my improved pretzel making machine.

Figure 2 is a plan view of same.

Figure 3 is a side view of one of the cam plates.

Figure 4 is a vertical sectional view taken on the line 4—4 of Figure 1.

Figure 5 is an enlarged detail sectional view of the pick-up and twisting mechanism.

Figure 6 is a detail sectional view taken on the line 6—6 of Figure 5.

Figure 7 is a detail sectional view taken on the line 7—7 of Figure 5.

Figure 16 is a diagrammatical view showing the manner in which the pretzel gripping members support one end of the pretzel rod.

Figure 17 is a diagrammatical view illustrating the manner in which the intersecting portions of the pretzel dough are pressed together.

Figure 14:
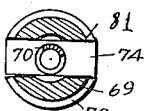
Figure 14 is a detail sectional view taken on the line 14—14 of Figure 5.

Referring to the accompanying drawings I have used the reference numeral 10 to indicate the frame of my improved mechanism. One end of the frame is provided with a shaft 11 and the opposite end with a shaft 12. Supported on the shaft 11 are sprocket wheels 13 and on the shaft 12 are sprocket wheels 14.

Figure 10:
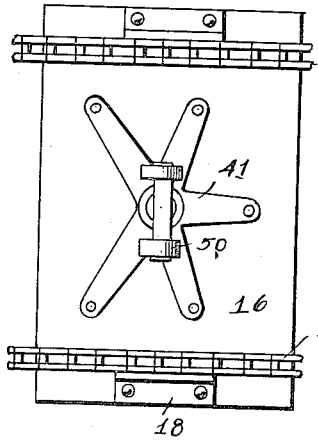
Figure 10 is an inverted view of one of the conveyor sections showing the mechanism for releasing the pretzel from its form.

Said sprocket wheels 13 and 14 are designed to carry conveyor chains 15. Said chains are mounted on transversely arranged plates 16 and 17 by means of suitable brackets 18, see Figure 10.

A sprocket wheel 19 is provided on one end of the shaft 11 designed to carry a chain 20 driven by means of a sprocket 21 from a shaft 22 carried by the frame 10. The shaft 22 is driven by means of a gear 23 which in turn is driven by a pinion 24 from speed reducing gear mechanism within the gear case 25, said mechanism being driven by means of a motor 26 and a chain 27.

Supported beneath the delivery end of the conveyor 28, formed by the chains 15 and the plates 16 and 17, is an auxiliary conveyor 29 carried by pulleys 30 and 31 and driven by means of a sprocket 32 attached to the pulley 30 by means of the shaft 33. Said sprocket 32 is driven from a chain 34 operating over a sprocket 35 attached to one end of the shaft 12. Thus means is provided for continuously operating the conveyors 28 and 29. The conveyor 29 is designed to receive a series of plates 36 adapted to receive the formed pretzel from the conveyor 18 in a manner hereinafter made clear.

Supported on each of the plates 16 is a series of upright posts 37 arranged in a row having the contour of the annular portion of the finished pretzel, to provide a form around which a rod of plastic dough may be wrapped, as the pretzel is being formed.

To retain the dough in position I have provided on the upper end of each of the members 37 a pivoted retaining wing 38, each of the wings having an inwardly extending arm 39. Connected to the inner end of each of the arms 39 is a vertical rod 40 passing downwardly through the plate 16. The lower end of all of the rods 40 is pivotally connected to a common spider 41. The central portion of the spider 41 is mounted on a plunger 42, slidably mounted in a spring barrel 43. The upper end of the plunger 42 has a flange 44 designed to rest on the upper end of a coil spring 45, supported within the barrel 43. The flange 44 has a lug 46 designed to pass through a vertical slot 47 in the barrel 43 to hold the plunger 42 against rotation within said barrel but to permit free vertical movement of the same.

Figure 13:
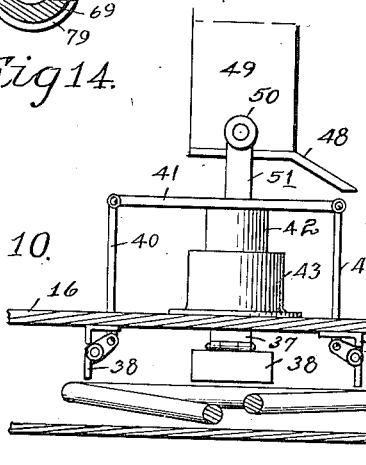
Figure 13 illustrates the manner in which the pretzel is released from its form.
Figure 11:
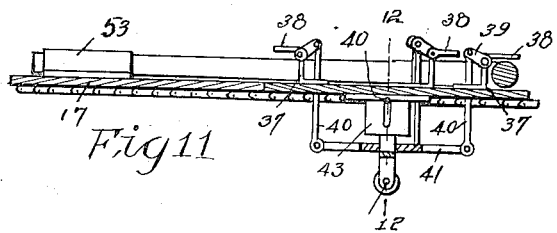
Figure 11 is a detail sectional view taken on the line 11—11 of Figure 2.
Figure 12:
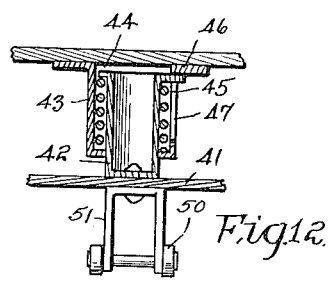
Figure 12 is a detail sectional view taken on the line 12—12 of Figure 11.

By this arrangement it will be seen that if the spider 41 is lowered as viewed in Figure 11, the free ends of the retaining wings 38 will be elevated so that the pretzel wound around the form may be easily released when the plate 16 is in an inverted position as illustrated in Figure 13, at which time the member 41 is elevated instead of lowered.

The elevation of the member 41 is accomplished by means of cams 48 carried by suitable brackets 49 from the upper portion of the main frame 10. The cams 48 are engaged by rollers 50 carried by a bracket 51 attached to the central portion of the member 41.

These parts are so arranged that as the conveyor plate 16 is moved to the left, as viewed in Figure 13, the rollers 50 will engage the inclined cam portions 48 and be moved to their elevated position against the action of the spring 45, causing the finished pretzel 52 to be released and permitted to fall to one of the plates 36 carried by the conveyor 29.

Each of the plates 17 is provided with a pair of upright bracket members 53 designed to limit the inward movement of the pretzel rod in the first step of the formation of the pretzel. As it will be seen from the drawings, the plates 16 and 17 are arranged alternately so that the pretzel as it is being formed is carried by both of the plates 16 and 17.

The plate 17 is also provided with transversely arranged recesses 54 which assist in closing the grasping fingers in the manner hereinafter described. The brackets 53 have notches 55 for receiving said fingers at the time the ends of the pretzel rod are grasped.

The forward end of the frame 10 is provided with table members 56 for receiving the pretzel rods. Each of the tables is provided with a pivot member 57 for supporting a spring actuating arm 58. The arms 58 are supported in a converging manner to lap the pretzel rod around the form members 37 as the conveyor is advanced. The rod of dough, indicated by the numeral 59, is placed transversely across the conveyor with its ends resting on the tables 56 and immediately ahead of the front member 37.

Figure 8:
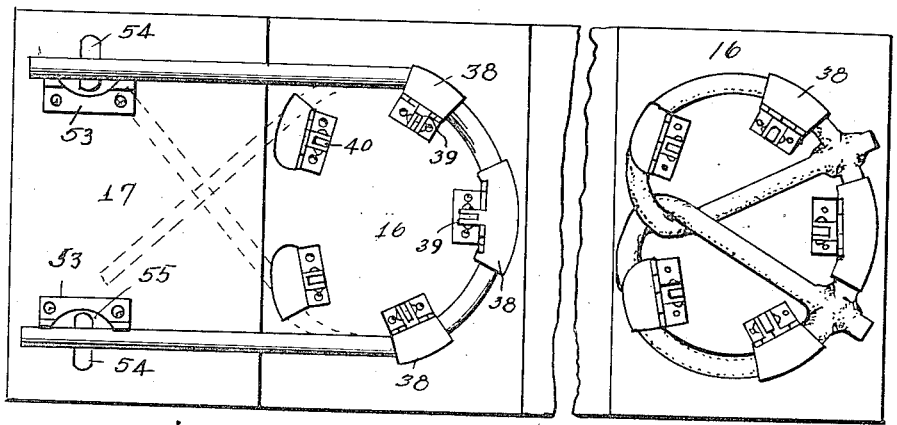
Figure 8 is a plan view of two of the conveyor sections illustrating the manner in which the pretzel is placed on the pretzel form.
Figure 9:
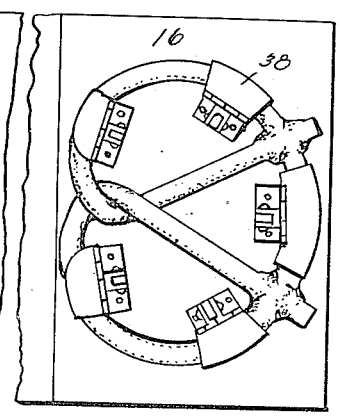
Figure 9 is a plan view of one of the conveyor sections showing the completed pretzel before it has been released.

The advance movement of the conveyor will cause the rod 59 to engage the members 58 and to be wrapped around the three forward members 37, with the ends of the rod resting against the bracket members 53 in the manner illustrated in Figures 2 and 8.

Thus the first part of the operation of forming the pretzel has been accomplished and the pretzel is then carried forwardly to position under an auxiliary frame 60. Said auxiliary frame has guide members 61 to support a moving head or carriage 62, said carriage being reciprocated in guides 61 by means of links 63 carried by crank members 64 mounted on a shaft 65 supported above the shaft 22. Said shaft 65 is driven by means of a gear 66 in mesh with the gear 23. The gear ratio between the crank shaft 65 and the conveyor 28 is such that the carriage 62 will be moved forwardly each time one of the plates 17 moves into position beneath the forward end of the guide members 61, and to travel at a somewhat faster speed than the said conveyor 28, whereby the ends of the pretzel rod 39 may be grasped and carried forwardly to position overlapping the curved portion of the pretzel, and at the same time causing the legs of the pretzel to be twisted around each other.

The mechanism for picking up the ends of the rods of dough and twisting the legs into the U-shaped member as they are moved to folded position comprises a shaft 67 rotatively and slidably mounted in the carriage 62. The lower end of the shaft 67 has a head 68 fixed thereon. Each end of the head 68 is designed to support a shaft 69 which has an opening 70 in its lower end.

Said shaft 69 also has slots 71 in which fingers 72 are pivotally mounted, as clearly illustrated in Figure 5. The fingers 72 have cam portions 73 at their upper ends on which is supported a plate 74 designed to carry a spring 75 mounted in the opening 70. The spring provides means for yieldably holding the fingers 72 either in an open or closed position.

Figure 15:
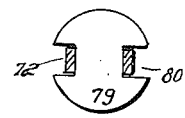
Figure 15 is a detail sectional view taken on the line 15—15 of Figure 5.

Slidably mounted on the outside of each of the shafts 69 is a sleeve 76 having a collar 77 at its upper end provided with an annular groove 78. The lower end of the sleeve is provided with a disk 79 having notches 80 for receiving the fingers 72, see Figure 15. The sleeves 76 have grooves 81 for receiving the plate 74 and the fingers 72.

A yoke 82 is designed to be supported in the annular grooves 78 for elevating and lowering the collar 77 together with the members 76 and 79. The central portion of the yoke 82 is carried by the lower end of the shaft 83, supported longitudinally through the center of the shaft 67. Said shaft 83 provides means for elevating and lowering the yoke 82, and also for rotating the shafts 69.

One of the shafts 69 has a gear 84 fixed to its upper end and designed to mesh with an idler pinion 85 mounted on a shaft 86 carried by the head 68. The pinion 85 meshes with a pinion 87 feathered to the shaft 83. The other shaft 69 is provided with a gear 88 designed to mesh with a pinion 89, also feathered to the shaft 83. A washer 90 is preferably placed between the pinions 87 and 89, while said pinions and washer 90 are supported against downward movement by means of a bracket 91 fixed to the head 68, see Figure 7.

By this arrangement it will be seen that if the shaft 67 is rotated and the shaft 83 held stationary, the head 68 will also be rotated at the same time, causing the gears 84 and 88 to be rotated. The said gears 88 are rotated substantially a half revolution, while the head is being rotated through a complete revolution. The shafts 69 are rotated in opposite directions to each other. The purpose of this will be hereinafter made clear.

For rotating the shaft 67 I have provided a gear wheel 92 at its upper end, designed to mesh with a rack 93 secured to the inner face of the cam plate 94. The gear 92 engages the rack on a portion of the forward movement of the carriage 62. The upper end of the shaft 67 is rotatively mounted in a plate 95 having rollers 96 at its edges designed to operate in roller grooves 97 in the cam plates 94. Said rollers 96 provide means for elevating and lowering the shaft 67. Each corner of the plate 95 is provided with upwardly and downwardly extending rollers 98 designed to roll against the edges of the cam flanges 99 to prevent rotation of the plate 95.

Secured to the upper portion of the plate 95 is a bracket 100 having an elongated opening 101 through which the upper end of the shaft 83 is slidably mounted, said upper end being flattened to fit the slot and to prevent turning of the shaft 83, and at the same time permit up and down movement of the shaft. The upper end of the shaft 83 is provided with a bracket 102 having rollers 103 designed to pass beneath the cams 104 on the forward movement of the carriage 62, and to pass over the tops of said cams on the return movement of said carriage.

The cam plates 94 are formed right and left, one of which is illustrated in Figure 3. Otherwise both of the plates are similar.

As the carriage 62 is moved rearwardly, the rollers 96 travel in the upper portion of the cam path 97 until they reach the downwardly curved portion 105. The rollers then descend in said path, due to the weight of the shaft 67, and the mechanism carried thereby, at the time the crank 64 is at its rearward dead center position. Further rotation of the crank 64 in an anti-clockwise direction, as shown in Figure 1, will cause the rollers to move in the lower portion of the path 97 and the fingers 72 to be lowered to position entering the grooves 54 of the plate 17, and straddling the rear ends of the pretzel rod. Further downward movement of the fingers will cause them to engage the inclined portions of the grooves 54, and to be moved to a closed position beneath the pretzel rod. The inclined portion of the cam 73 will then engage the plate 74, causing the fingers to be yieldingly held in a closed position.

Further forward movement of the carriage will cause the rollers to climb the inclined portions 106 of the grooves 67, causing the fingers 72 to be elevated a slight distance, and also the ends of the pretzel rod. The rollers 97 will then enter the horizontal portion 107 of the grooves 97, at which time the gear 92 will engage the rack 93, causing the head 68 to be rotated through one revolution and the shafts 69 through a half revolution, carrying the ends of the pretzel rod over the curved portion to intersect the curved portion of the points 108, at which time the rollers 97 enter the downwardly inclined portion 109 of the groove 97, again lowering the fingers 72, permitting the ends of the pretzel to cross the portions 108. At this time the rollers 103 engage the cam 104, causing the shaft 83 to be lowered relative to the shaft 67, and in turn causing the collars 77 to be lowered, together with the sleeves 76 and the plates 79.

The inner edges of the grooves 80 of said plates 79 engage the inner curved faces of the fingers 72 and cause them to be separated and moved to their open position, and to thus release the ends of the pretzel. Further downward movement of the plate 79 will press the intersecting portions of the pretzel together in the manner illustrated in Figure 17. Further forward movement of the carriage will cause the rollers 103 to disengage the cams 104, at which time the spring 110 will elevate the bracket 102, and in turn the shaft 83, causing the plates 79 to return to their normal position. The rollers 97 will then enter the ascending inclined portion 111 of the grooves 97 and pass beneath the dogs 112 and into the extreme forward end of the groove 97.

It will be seen that the rollers will pass over the top of the dogs 112 on their return movement and enter the upper portion of the groove 97, thus continuing the cycle of operation.

By this arrangement it will be seen that if the fingers 72 grasp the ends of the pretzel rods when in the position illustrated in Figure 8, and that the head 68 is rotated, then the said rods will be twisted around each other as they are moved forwardly, it being understood that the carriage 67 moves faster than the conveyor 28.

The rods will enter beneath the rear plates 38 in the manner illustrated by dotted lines, to hold the annular portion of the pretzel on the form members 37, as the twisting and forward movement of the ends of the pretzel is completed.

The head 68 rotates through a complete revolution while the fingers 72 rotate through a half revolution to place the ends of the rods in the opposite direction from what they originally assumed.

As the conveyor 28 is advanced, the plate 16 on which the pretzel is now mounted will pass over the sprockets 14 to its inverted position in the under run of the conveyor, at which time the rollers 50 will engage the cam plates 48 in the manner before described, causing the retaining plates 38 to be moved to their open position and to permit the formed pretzel to fall on one of the plates 36 carried by the conveyor 29, thus completing the operation. The plates 36 may be removed as soon as they have been filled with pretzels and transferred to the baking oven. The plates may be placed on the conveyor 29 either automatically or manually, as is wished, as this forms no part of my present invention.

Thus it will be seen that I have provided a pretzel machine which is capable of receiving the rods of pretzel dough, which may be placed either manually or automatically on the forward end of the conveyor 28 immediately in front of the pretzel forms, after which the rod is then automatically given the desired form which very closely resembles a hand made pretzel. The movement of the grasping fingers 72 is substantially the same as that performed in the hand operation.

I claim as my invention:

1. A pretzel making machine comprising a support, a pretzel form carried by said support, means for first bending the rod of pretzel dough substantially half way around said form with parallel legs projecting beyond said form and adjacent to said support, retractable means for retaining the curved portion of said body on said form, means for grasping and moving the free ends of said legs outwardly from said support and advancing them over said curved portions, means for rotating said grasping means and the said ends to twist the legs around each other as their ends are advanced, means for moving said ends toward the curved portion of said body to cross the same, means for pressing the intersecting portions together, and means for retracting the retaining means from said pretzel form to permit the pretzel to be released.

2. In a pretzel making machine, a horizontal support, a pretzel form carried by said support, means for bending a rod of pretzel dough around said form and adjacent to said support with its ends parallel and projecting from one side of said support, means for grasping and moving the ends of said pretzel over the curved portion of said pretzel, and for twisting one portion around the other and moving the ends to position in contact therewith, retractable means for retaining the pretzel on the form while being shaped, means for inverting the horizontal support, and means for retracting the retaining means from the form after the form has been inverted to release the pretzel therefrom by gravity.

3. In a pretzel making machine, a support, upright pretzel supporting elements arranged in a curved row having the contour of the annular portion of a finished pretzel and adapted to have a rod of pretzel dough wound around them as the pretzel is formed, a retaining wing pivoted to the free end of each upright element, means for holding said retaining wings in position to support a portion of a pretzel rod on said elements as the pretzel is being formed, and means for simultaneously moving all of said retaining means to inoperative position when the pretzel has been completed.

4. A pretzel making machine comprising a supporting frame, a continuously moving conveyor element, a series of pretzel forms carried by said element, means for successively placing rods of plastic pretzel material partially around said forms as the conveyor is advanced, a carriage mounted to move longitudinally of the conveyor and at a different speed, means for actuating the carriage, a head rotatively mounted on said carriage and adapted to be elevated and lowered, two sets of pretzel grasping means carried by said head, means for causing said grasping means to pick up the ends of the pretzel rod as the head is lowered, means for elevating said head, means for rotating said head together with the grasping means through an angle of 360°, and means for rotating said grasping means through an angle of 180° and in opposite directions, means for lowering said head with the ends of said rods crossing the body portion of said pretzel, and means for pressing the intersecting portions of said pretzel together.

5. In a pretzel making machine, an upright shaft rotatively and slidably mounted, a head on the lower end of said shaft, a pair of spaced finger supporting shafts rotatively mounted in said head, a second shaft rotatively and slidably mounted longitudinally in the first shaft, a pair of grasping fingers carried by the lower end of each of the pair of rotatively mounted shafts, means for yieldably retaining the fingers in either an open or closed position, means for closing the fingers as the head is lowered, a sleeve slidably mounted on each of said finger supporting shafts, a yoke connecting said sleeves with a second slidably mounted shaft, a plate carried by the lower end of each of said shafts having a portion supported between said fingers, whereby downward movement of the sleeves and plate will cause said fingers to be moved to an open position, and whereby the under surfaces of said plate will cause intersecting portions of dough to be pressed together, and gear mechanism carried by the second slidably mounted shaft for driving the finger supporting shafts in opposite directions as the gear supporting shaft is rotated.

6. In a pretzel making machine, an upright shaft rotatively and slidably mounted, a head on the lower end of said shaft, a pair of spaced finger supporting shafts rotatively mounted in said head, a second shaft rotatively and slidably mounted longitudinally in the first shaft, a pair of grasping fingers carried by the lower end of each of the pair of rotatively mounted shafts, means for yieldably retaining the fingers in either an open or closed position, means for closing the fingers as the head is lowered, a sleeve slidably mounted on each of said finger supporting shafts, a yoke connecting said sleeves with a second slidably mounted shaft, a plate carried by the lower end of each of said shafts, having a portion supported between said fingers, whereby downward movement of the sleeves and plate will cause said fingers to be moved to an open position, and whereby the under surfaces of said plate will cause intersecting portions of dough to be pressed together, gear mechanism carried by the second slidably mounted shaft for driving the finger supporting shafts in opposite directions as the gear supporting shaft is rotated, means for elevating and lowering the first shaft, means for rotating said first shaft through an angle of 360°, means for rotating the second slidably mounted shaft, and means for elevating and lowering said second shaft.

7. In a machine of the class described, the combination of two dough gripping devices each including in its construction two fingers capable of movement toward and from each other to grip and release the ends of a rod of dough or the like; means for operating the dough grippers to shape the central portion of the rod of dough carried thereby, into a substantially circular form comprising means for rotating the dough gripping devices relative to each other to twist the leg portions of the circular form of dough about each other and to place the end portions of the dough rod across the circular portion; means for applying pressure only to the overlapping portions of said dough rod, said means comprising pressure plates adjacent to said fingers, means for moving said plates downwardly, and means for separating the gripping fingers simultaneously with said downward movement of the presser plates; and means for independently rotating each dough gripping device in such direction as to prevent torsional twisting of the end portions of the dough rod.

8. In a machine of the class described, the combination of two dough gripping devices each including in its construction two fingers capable of movement toward and from each other to grip and release the ends of a rod of dough or the like; means for operating the dough grippers to shape the central portion of the rod of dough carried thereby, into a substantially circular form comprising means for rotating the dough gripping devices relative to each other to twist the leg portions of the circular form of dough about each other and to place the end portions of the dough rod across the circular portion; means for applying pressure only to the overlapping portions of said dough rod, said means comprising presser plates adjacent to said fingers, means for moving said plates downwardly, and means for separating the gripping fingers simultaneously with said downward movement of the presser plates; and means for independently rotating each dough gripping device in such direction as to prevent torsional twisting of the end portions of the dough rod.

9. In a pretzel making machine, the combination of means for supporting a dough stick; two pairs of gripping fingers shaped to grip the end portions of a dough rod; means for moving the gripping fingers in such manner as to twist the dough rod into pretzel form; a presser plate between the fingers of each pair of gripping fingers; means for moving the gripping fingers with the ends of the dough rod toward the looped portion of the pretzel, and means for separating the gripping fingers and forcing the presser plates against the overlapping portions of the dough rod ends and looped portion.

10. A pretzel making machine comprising a movable conveyor, means for forming a stick of dough into a substantially U shaped body supported by said conveyor, means for engaging and lifting the end portions of said stick of dough and moving them to position over the loop portion of the stick of dough, means for rotating said lifting means to twist the end portions of the stick of dough around each other, means for lowering the end portions of the stick of dough to position adjacent the loop portion thereof, and means for applying pressure to the intersecting portions of the stick to press said portions of the dough together.

11. In a pretzel making machine, a support for a pretzel being formed, a pair of pretzel gripping jaws, means for moving their lower ends toward each other for gripping the end of a pretzel stick and for separating their lower ends to release a pretzel stick, a presser plate between the jaws, and means for moving it downwardly when the jaws are separated to press upon a pretzel stick resting on said support.

12. In a pretzel making machine, the combination of a support for a pretzel stick, said support being formed with a depression having inclined side walls, a pair of pretzel gripping fingers pivotally supported and movable toward and from said depression, said fingers being so shaped that when they are brought into engagement with said inclined walls of the depression they will be guided by said inclined walls toward each other to pretzel gripping position.

13. In a pretzel machine, the combination of a support, a carriage, a head rotatably mounted on the carriage, two sets of pretzel gripping means carried by said head, means for rotating said head for pretzel twisting purposes, and means for rotating the pretzel gripping means relative to said head for straightening out the end portions of a pretzel.

HARRY A. ELLIOTT.